(12) United States Patent
Whitehead et al.

(10) Patent No.: US 7,025,121 B2
(45) Date of Patent: Apr. 11, 2006

(54) REFRIGERATION/RETHERMALIZATION FOOD DELIVERY SYSTEM

(75) Inventors: Lara Lee Whitehead, Smyrna, TN (US); Natalia V. Johnson, Antioch, TN (US); Rodger Dale Crocker, Hendersonville, TN (US); David Riley Gordon, Nashville, TN (US); Gary C. DeGrow, Goodlettsville, TN (US); William Curt Griggs, Hendersonville, TN (US); W. Burk Wyatt, Brentwood, TN (US)

(73) Assignee: Aladdin Temp-Rite, LLC, Hendersonville, TN (US)

( * ) Notice: Subject to any disclaimer, the term of this patent is extended or adjusted under 35 U.S.C. 154(b) by 177 days.

(21) Appl. No.: 10/635,120

(22) Filed: Aug. 6, 2003

(65) Prior Publication Data

US 2005/0028543 A1    Feb. 10, 2005

(51) Int. Cl.
*F25B 29/00*    (2006.01)
*B60H 1/00*    (2006.01)

(52) U.S. Cl. ............................ 165/42; 165/41; 165/58; 165/75; 165/919

(58) Field of Classification Search ................. 165/41, 165/42, 58, 59, 61, 63, 72, 75, 80.1, 108, 165/135, 138, 918, 919
See application file for complete search history.

(56) References Cited

U.S. PATENT DOCUMENTS

| | | | |
|---|---|---|---|
| 3,262,650 A | 7/1966 | Randich | |
| 3,275,393 A | 9/1966 | Stentz et al. | |
| 4,156,456 A | 5/1979 | Muller | |
| 4,203,486 A | 5/1980 | Rubbright et al. | |
| 4,323,110 A | 4/1982 | Rubbright et al. | |
| 4,397,159 A | 8/1983 | Dodd | |
| 4,544,024 A | 10/1985 | Baggott | |
| 5,069,273 A | 12/1991 | O'Hearne | |
| 5,131,841 A | 7/1992 | Smith et al. | |
| 5,182,438 A | 1/1993 | Oakes et al. | |

(Continued)

FOREIGN PATENT DOCUMENTS

WO    WO 00/54641    *   9/2000

(Continued)

OTHER PUBLICATIONS

A la Cart, Inc., Satellite & Serve: Standard 9 Pan, website printout from www.alacartinc.com/p_ss_s9.htm; Jul. 24, 2003.

(Continued)

*Primary Examiner*—Ljiljana Ciric
(74) *Attorney, Agent, or Firm*—Womble Carlyle Sandridge & Rice, PLLC; Jeffrey R. McFadden

(57) ABSTRACT

A refrigeration/rethermalization food service system includes a food service cart having hot and cold chambers for receiving pre-plated foods. A hot air plenum is provided along a sidewall of the cart in the hot chamber, and a cold air plenum is provided along a sidewall of the cold chamber. To rethermalize foods in the hot chamber, heated air is forced into the hot air plenum from a docking station, and the heated air is evenly distributed from the plenum into the hot chamber. To refrigerate foods in the cold chamber, chilled air is forced into the cold air plenum from the docking station, and the chilled air is evenly distributed from the plenum into the cold chamber. The substantially uniformly distributed convective air currents provide substantially even heating and cooling of foods located in all portions of the hot and cold chambers.

10 Claims, 13 Drawing Sheets

U.S. PATENT DOCUMENTS

| | | | |
|---|---|---|---|
| 5,285,051 | A | 2/1994 | DeGrow et al. |
| 5,404,935 | A | 4/1995 | Liebermann |
| 5,449,232 | A | 9/1995 | Westbrooks et al. |
| 5,510,601 | A | 4/1996 | Smith et al. |
| 5,655,595 | A | 8/1997 | Westbrooks et al. |
| 5,717,192 | A | 2/1998 | Dobie et al. |
| 5,797,445 | A | 8/1998 | Westbrooks et al. |
| 5,975,202 | A | 11/1999 | Grandi |
| 6,073,547 | A | 6/2000 | Westbrooks et al. |
| 6,105,818 | A | 8/2000 | Speranza |
| 6,315,039 | B1 | 11/2001 | Westbrooks et al. |
| 6,684,657 | B1 | 2/2004 | Dougherty |

FOREIGN PATENT DOCUMENTS

| | | |
|---|---|---|
| WO | WO 00/55555 | 9/2000 |
| WO | WO 00/55556 | 9/2000 |

OTHER PUBLICATIONS

A la Cart, Inc., System II website printout from www.alac-artinc.com/p_s2.htm; Jul. 24, 2003.

USECO, Unitron5, Retherm Module, website printout from www.useco.com/html/uni5modsp.html; Jul. 24, 2003.

USECO, Unitron5, Retherm Cart, website printout from www.useco.com/html/uni5mod.html and from www.useco.com/html/tour4.html; Jul. 24, 2003.

USECO, Unitron3, Retherm Cart, website printout from www.useco.com/html/uni3cart.html; Jul. 24, 2003.

USECO, Unitron3 Tray Transport Cart, website printout from www.useco.com/html/uni3cartsp.html; Jul. 24, 2003.

Dinex International, Perfect Temp Thermalization Cart, website printout from www.dinex.com/ptcart.html; Jul. 24, 2003.

Dinex International, Perfect Temp Thermal Aire Systems, website printout from www.dinex.com/thermaire.html; Jul. 24, 2003.

Socamel Rescaset, printout from website at www.socamel.com/ecrit/fichsocamel2.htm; Jul. 24, 2003.

Burlodge, Ltd., Friotherm Thermagen Ovengen Traygen, printout from www.burlodge.com/content/p4.htm; Jul. 24, 2003.

Aladdin Temp Rite, LLC, Convect-Rite II Rethermalization Cart brochure, date at least as early as Aug. 6, 2003, believed to be prior art.

* cited by examiner

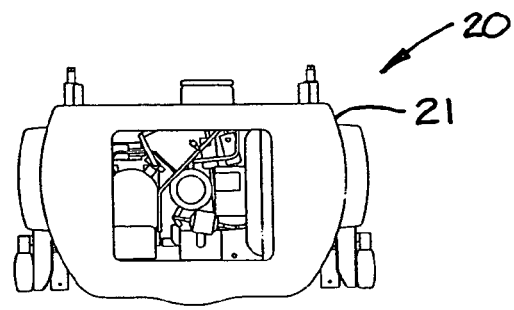
FIG. 4
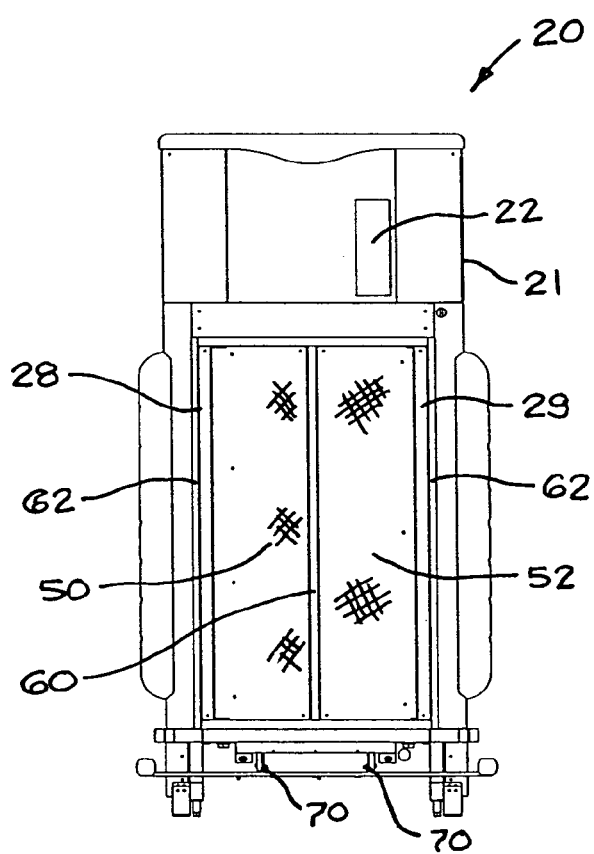
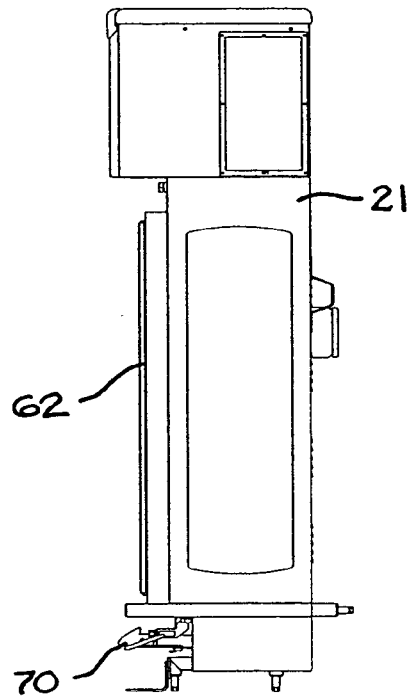
FIG. 3  FIG. 5

REFRIGERATION/RETHERMALIZATION FOOD DELIVERY SYSTEM

FIELD OF THE INVENTION

The invention generally relates to institutional food delivery systems, and more particularly relates to a food delivery cart and docking station that combine to provide substantially evenly distributed heated and chilled convective air currents within the cart to respectively heat and cool foods stored in separate hot and cold chambers in the cart.

BACKGROUND

Institutions such as hospitals and nursing homes must serve palatable meals comprising both hot and cold foods to large numbers of persons in widely dispersed remote locations. Often, such institutions must serve these meals long after the meals are prepared and assembled. Accordingly, such institutions require means for storing and transporting pre-prepared meals to remote locations in a manner that preserves the safety and palatability of the foods, and also permits hot foods to be served hot and cold foods to be served cold.

Various types of food storage and transportation systems are known for delivering foods that are prepared in a central food preparation facility to remote food service locations. Several of these known food delivery systems include means for refrigerating and/or rethermalizing pre-prepared foods. These systems generally are of two types. A first type of system includes a stand-alone storage and transportation cart that includes an onboard refrigeration system for chilling at least a portion of the foods in the cart, and/or an onboard rethermalization system for heating at least a portion of the foods in the cart. One such system and cart is described in U.S. Pat. No. 6,073,547 to Westbrooks, Jr. et al. Typically, such a system includes a refrigeration unit for circulating chilled air in at least a portion of the cart. When such a system includes a rethermalization system, heat is supplied to foods in the cart either by a plurality of distributed heating elements, or by circulating heated air in at least a portion of the cart. Such self-contained food delivery carts are costly, require frequent servicing, and their large size and weight makes such carts difficult to transport and maneuver.

A second type of system includes a portable storage and transportation cart, and a separate supply unit or docking station for refrigerating and/or reheating foods in the cart. Typically in such systems, the cart is mated with the docking station when cooling and/or heating is required in the cart. Once the cart is docked in the docking station, chilled air is supplied from the docking station's refrigeration system to at least a portion of the cart through a cold air inlet in the cart. When the system includes a convective rethermalization system, heated air is supplied from the docking station's heating system to at least a portion of the cart through a hot air inlet in the cart. A system of the type having a separate cart and docking station for refrigerating and heating foods in the cart is described in U.S. Pat. No. 5,655,595 to Westbrooks, Jr.

One shortcoming of known institutional refrigeration and rethermalization systems of either type described above is their inability to provide uniform convective cooling and/or heating to all foods within the cart. As cold air is circulated in such units, the cold air naturally tends to migrate to lower portions of the cart, thereby failing to provide a desired rate of cooling to foods located in upper portions of the cart. Similarly, heated air tends to rise to upper portions of the cart, thereby failing to provide a desired rate of heating to foods located in lower portions of the cart. In addition, the hot and cold air currents in such systems typically have velocities that are too low to provide efficient and uniform convective heating and cooling. Still further, such systems often permit heated and/or chilled air to bypass or circumvent desired flow paths in the systems. Such deviant air flows further contribute to the inefficiencies and lack of uniform heating and cooling in such systems.

Accordingly, there is a need for a refrigeration/rethermalization food delivery system that provides substantially uniform heating and cooling of a large quantity of food portions. In addition, there is a need for a refrigeration/rethermalization system that provides substantially uniform convective air currents that optimize system efficiency and uniformity.

SUMMARY

The invention includes a food refrigeration and rethermalization system comprising a cart and a docking station. The cart includes a housing having opposed first and second sidewalls, a thermal partition that divides an interior space in the housing into a cold chamber and a hot chamber, and a substantially open front. The cart further includes a vertically oriented cold air plenum formed between the first sidewall of the housing and a cold air distribution panel. The cold air plenum has a substantially open front end and a closed back end, and the cold air distribution panel has a plurality of cold air vents forming a plurality of cold air flow paths between the cold air plenum and the cold chamber. In addition, the cart includes a vertically oriented hot air plenum formed between the second sidewall of the housing and a hot air distribution panel. The hot air plenum has a substantially open front end and a closed back end, and the hot air distribution panel has a plurality of hot air vents forming a plurality of hot air flow paths between the hot air plenum and the hot chamber. The docking station includes a cold air supply system for supplying forced chilled air into the substantially open front end of the cold air plenum. The docking station further includes a hot air supply system for supplying forced heated air into the substantially open front end of the hot air plenum. One or more seals are configured to provide substantially air-tight mating engagement between the docking station and the front of the cart when the cart is docked to the docking station.

The invention also includes a food service cart. The cart includes a housing having a bottom, a top, a first sidewall, a second sidewall, a substantially open front, and an interior space. A thermal partition in the housing divides the interior space of the housing into a cold food compartment and a hot food compartment. A cold air plenum in the housing is adjacent to and substantially coextensive with the first sidewall of the housing. The cold air plenum includes a cold air intake port and a cold air distribution panel having a plurality of cold air vent openings. The cart further includes a hot air plenum in the housing adjacent to and substantially coextensive with the second sidewall of the housing. The hot air plenum includes a hot air intake port and a hot air distribution panel having a plurality of hot air vent openings. A movable front closure is provided for selectively closing the substantially open front of the housing, and a plurality of casters are provided on the bottom the housing. The cold air plenum defines a cold air distribution path between the cold air intake port and the cold food compartment through the plurality of cold air vent openings, and the hot air plenum defines a hot air distribution path between the hot air intake port and the hot food compartment through the plurality of hot air vent openings.

The invention further includes a convection heating and cooling air distribution system for a food service cart of the type having opposed first and second sidewalls and side-by-side hot and cold chambers between the sidewalls. The system includes a cold air distribution panel including a plurality of cold air vent openings therein, the cold air distribution panel being substantially parallel to the first sidewall, spaced from the first sidewall, and substantially coextensive with the first sidewall of the cart, thereby forming a cold air plenum between the first sidewall and the cold air distribution panel. The system further includes a cold air intake port at a front end of the cold air plenum, and a cold air return opening in the docking station. The system also includes a hot air distribution panel having a plurality of hot air vent openings therein. The hot air distribution panel is substantially parallel to the second sidewall, is spaced from the second sidewall, and is substantially coextensive with the second sidewall of the cart, thereby forming a hot air plenum between the first sidewall and the hot air distribution panel. The system further includes a hot air intake port at a front end of the hot air plenum, and a hot air return opening in the docking station. The system is configured such that a quantity of forced cold air entering the cold air plenum through the cold air intake port exits the cold air plenum through the cold air vent openings in the cold air distribution panel such that the quantity of forced cold air is substantially evenly distributed in the cold chamber as the cold air passes from the cold air vent openings to the cold air return opening. The system is also configured such that a quantity of forced heated air entering the hot air plenum through the hot air intake port exits the hot air plenum through the hot air vent openings in the hot air distribution panel such that the quantity of forced heated air is substantially evenly distributed in the hot chamber as the heated air passes from the hot air vent openings to the hot air return opening.

In addition, the invention includes a convective air distribution system for a food service cart of the type having side-by-side hot and cold chambers arranged between opposed sidewalls of the cart. The system includes means for receiving forced heated air into the cart from an external source of forced heated air, and means for substantially evenly distributing a flow of forced heated air received from the external source throughout the hot chamber. The heated air flows through the hot chamber above each food tray level in a direction that is substantially perpendicular to one of the sidewalls of the cart. The system further includes means for receiving forced chilled air into the cart from an external source of forced chilled air, and means for substantially evenly distributing a flow of forced chilled air received from the external source of forced chilled air throughout the cold chamber. The chilled air flows through the cold chamber above each tray level in a direction that is substantially perpendicular to the sidewalls of the cart.

A more thorough understanding of the invention will be apparent from a reading of the following detailed description together with the drawings.

BRIEF DESCRIPTION OF THE DRAWINGS

FIG. 3 is a front elevation view of the docking station shown in FIGS. 1 and 2;

FIG. 4 is a top plan view of the docking station shown in FIGS. 1–3;

FIG. 5 is a right side elevation view of the docking station shown in FIGS. 1–4;

FIG. 7 is a front and left side perspective view of a portion of the housing of the food service cart shown in FIGS. 1 and 2 with the;

DETAILED DESCRIPTION

Figure 1:
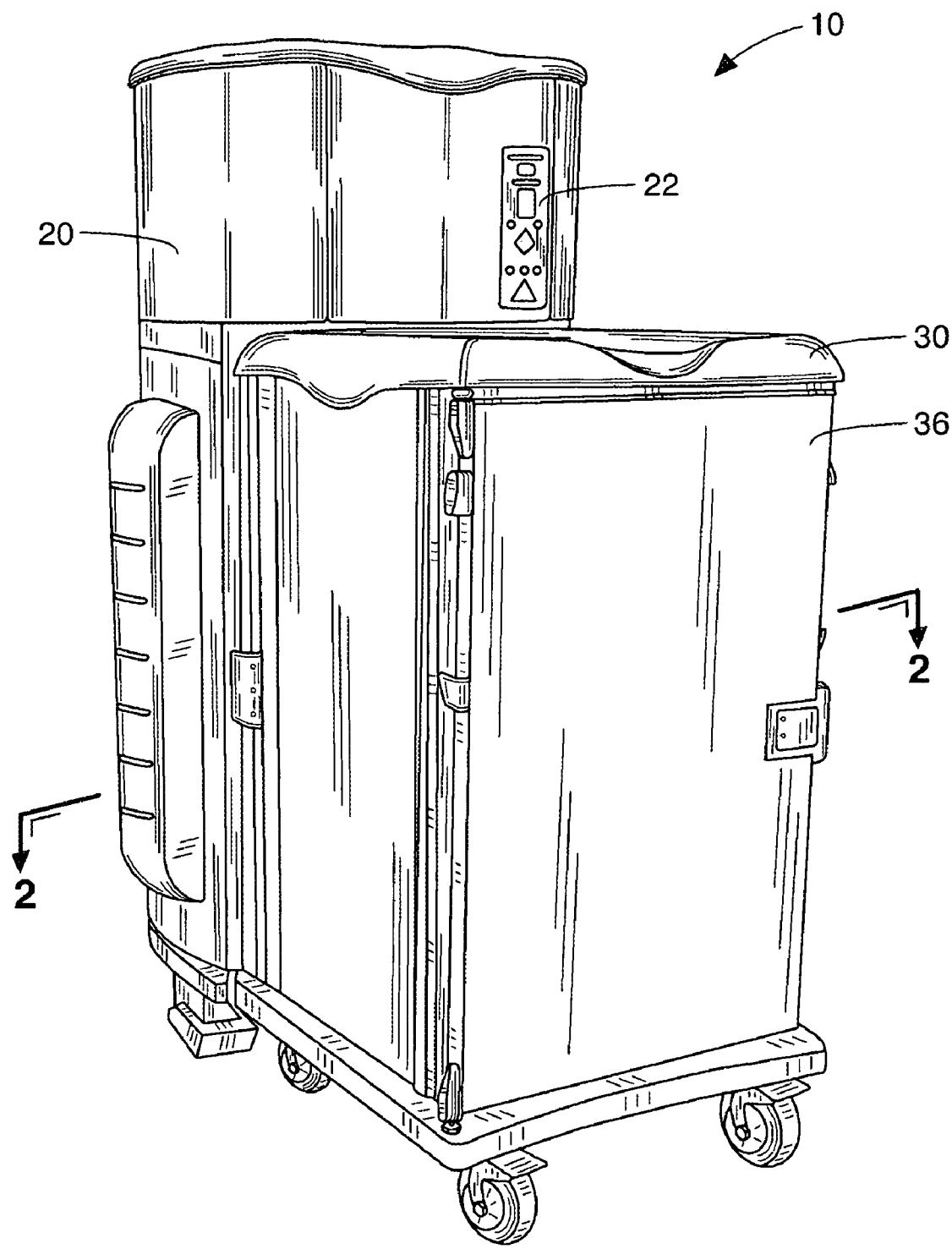
FIG. 1 is a perspective view of an embodiment of a refrigeration/rethermalization food delivery system according the invention.

An embodiment of a refrigeration/rethermalization food delivery system 10 according to the invention is shown in FIG. 1. This embodiment of the system 10 includes a docking station 20 and a cart 30. As shown in FIG. 1, the cart 30 matingly docks with the docking station 20. In this docked position, food inside the cart 30 is heated and/or cooled by convective air flows that are supplied by the docking station 20 and circulated through an interior space in the cart 30. The system 10 is controlled by a user via a control panel 22 that is located in an accessible location on the docking station 20. The cart 30 may include a back door 36 to permit an operator to access the interior of the cart 30 when the cart 30 is docked with the docking station 20.

Figure 2:
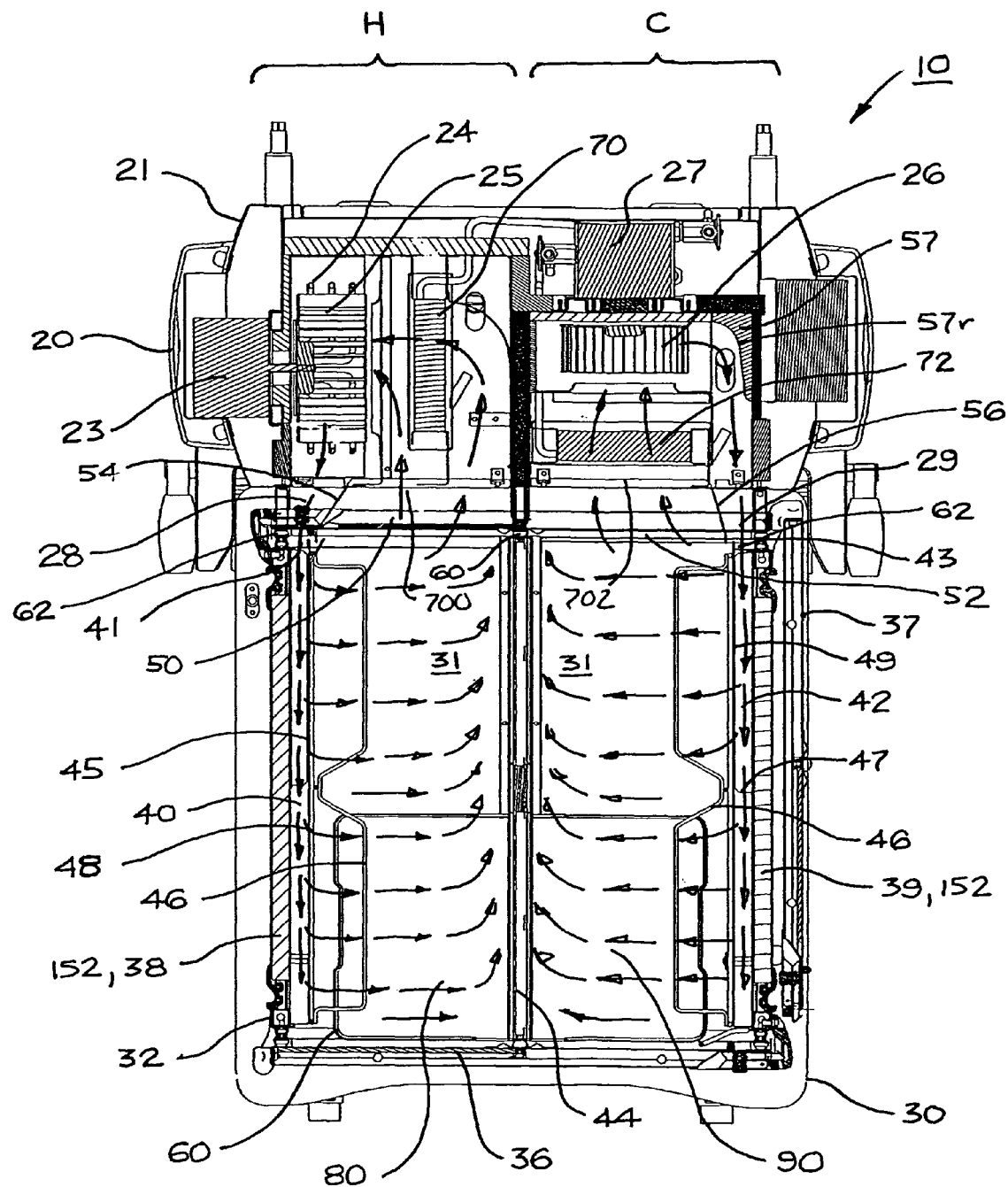
FIG. 2 is a top cross-section of the refrigeration/rethermalization food delivery system shown in FIG. 1 taken along line 2—2.

The cross-section of FIG. 2 shows the mating engagement between the docking station 20 and cart 30. When the cart 30 is docked with the docking station 20, a front door 37 of the cart 30 (the door closest to the docking station) is open and the front door 37 is moved to a docked position away from the open front of the housing 32. In the embodiment shown, the front door 37 is swung to a position adjacent to a second sidewall 39 of the housing 32. One or more gaskets 60, 62 are positioned between mating faces of the docking station 20 and cart 30 to prevent air from escaping from or infiltrating into the docking station 20 and cart 30 when docked together. In order to securely hold the docking station 20 and cart 30 together in the docked arrangement shown in FIG. 2, a coupler 70 may be provided on the docking station 20 (see FIGS. 5 and 16). The coupler 70 is configured to releasably engage and grasp a portion of the cart 30 when the cart 30 is docked with the docking station 20.

Figure 17:
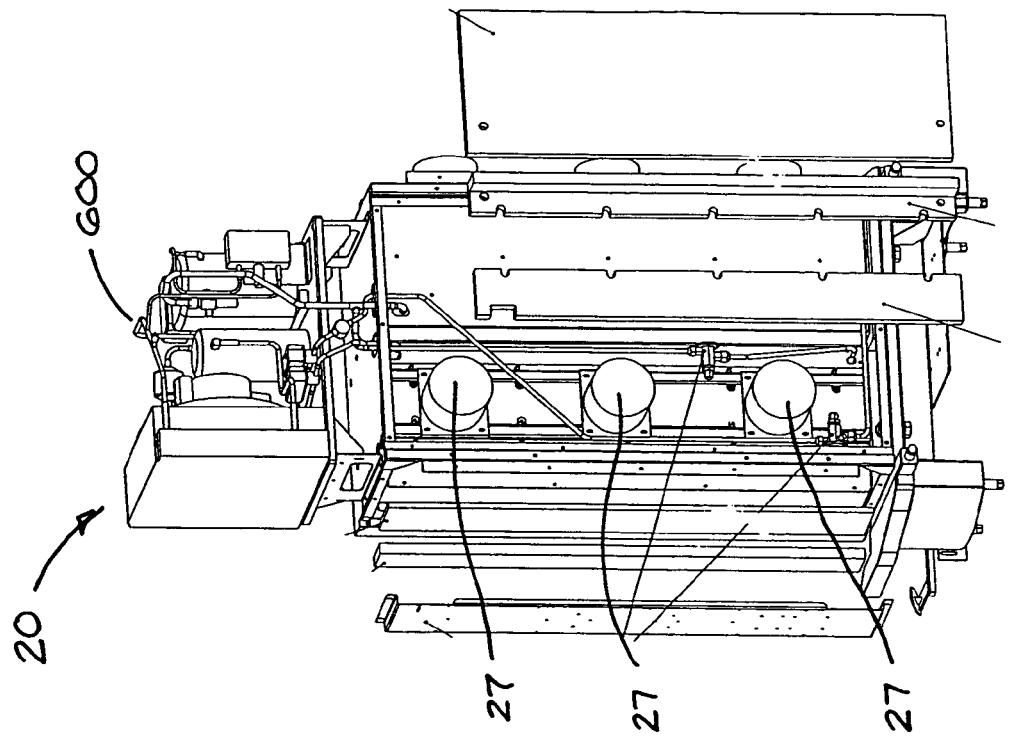
FIG. 17 is a partially exploded perspective view of the rear and right side of the docking section shown in FIG. 16.
Figure 16:
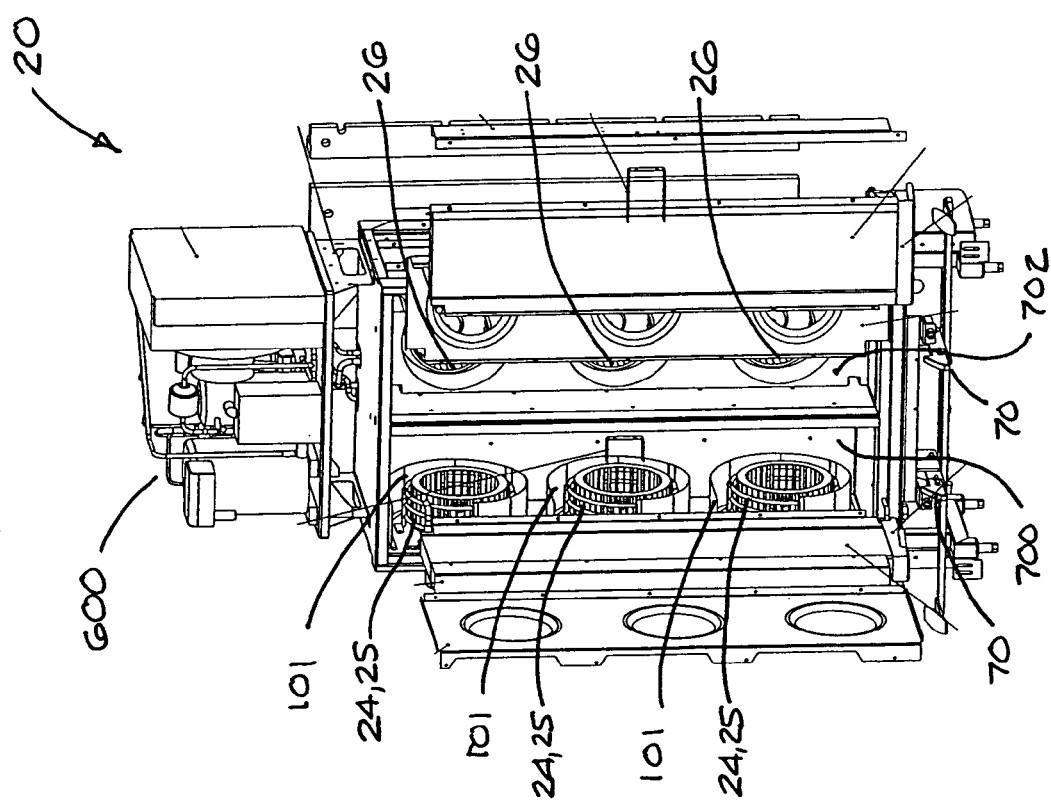
FIG. 16 is a partially exploded perspective view of the front and right side of the docking section shown in FIG. 1.
Figure 19:
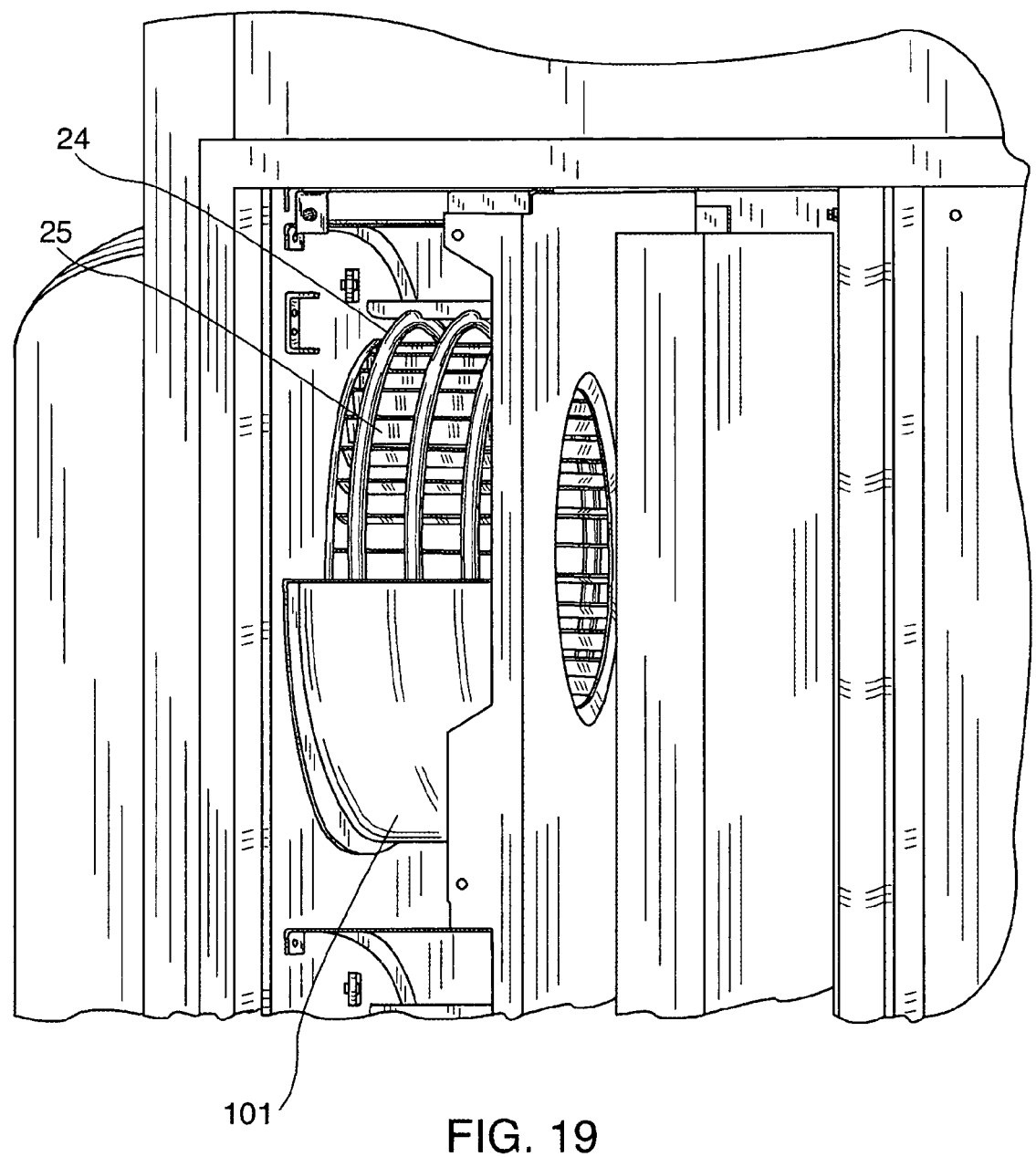
FIG. 19 is a perspective view of a portion of the docking station shown in FIG. 16 showing details of one of the hot air blowers.

In the embodiment of the system 10 shown in FIG. 2, hot air is supplied by a heating system located on the left side of the docking station 20. The heating system comprises one or more hot air blowers 25 and a plurality of electric resistance heating elements 24. As shown in FIGS. 16 and 17, in a preferred embodiment, the heating system includes three vertically arranged and vertically spaced hot air blowers 25 with a heating elements 24 associated with each blower 25. Returning to FIG. 2, each hot air blower 25 is powered by an electric motor 23. The hot air blower(s) 25 are configured such that air exiting the blower(s) 25 passes over the heating elements 24 and is directed toward the front of the docking station 20. As shown in FIGS. 16 and 19, cowlings 101 may be provided to direct the air from the blowers 25 toward the front of the docking station. As shown in FIG. 2, a hot air deflector 54 funnels air exiting the hot air blower(s) 25 through a hot air outlet port 28 on the left front side of the docking station 20.

A refrigeration system is provided to produce cold air that exits from the right side of the docking station 20 as shown in FIG. 2. The refrigeration system includes one or more cold air blowers 26, and a evaporator 72. As shown in FIGS. 16 and 17, a preferred embodiment includes three vertically arranged cold air blowers 26. As best seen in FIG. 2, a condenser 70 is located in the left heating portion of the docking station 20. A compressor and other refrigeration system components (generally indicated as 600 in the figures) are located in a housing 21 atop the docking station 20. In FIG. 2, the cold air blower(s) 26 are configured to blow air toward the right side of the figure. A cold air guide 57 turns the flow of cold air, and redirects the cold air toward the front of the docking station 20. A cold air deflector 56 funnels the air from the cold air blower(s) 26 through a cold air outlet port 29.

Figure 22:
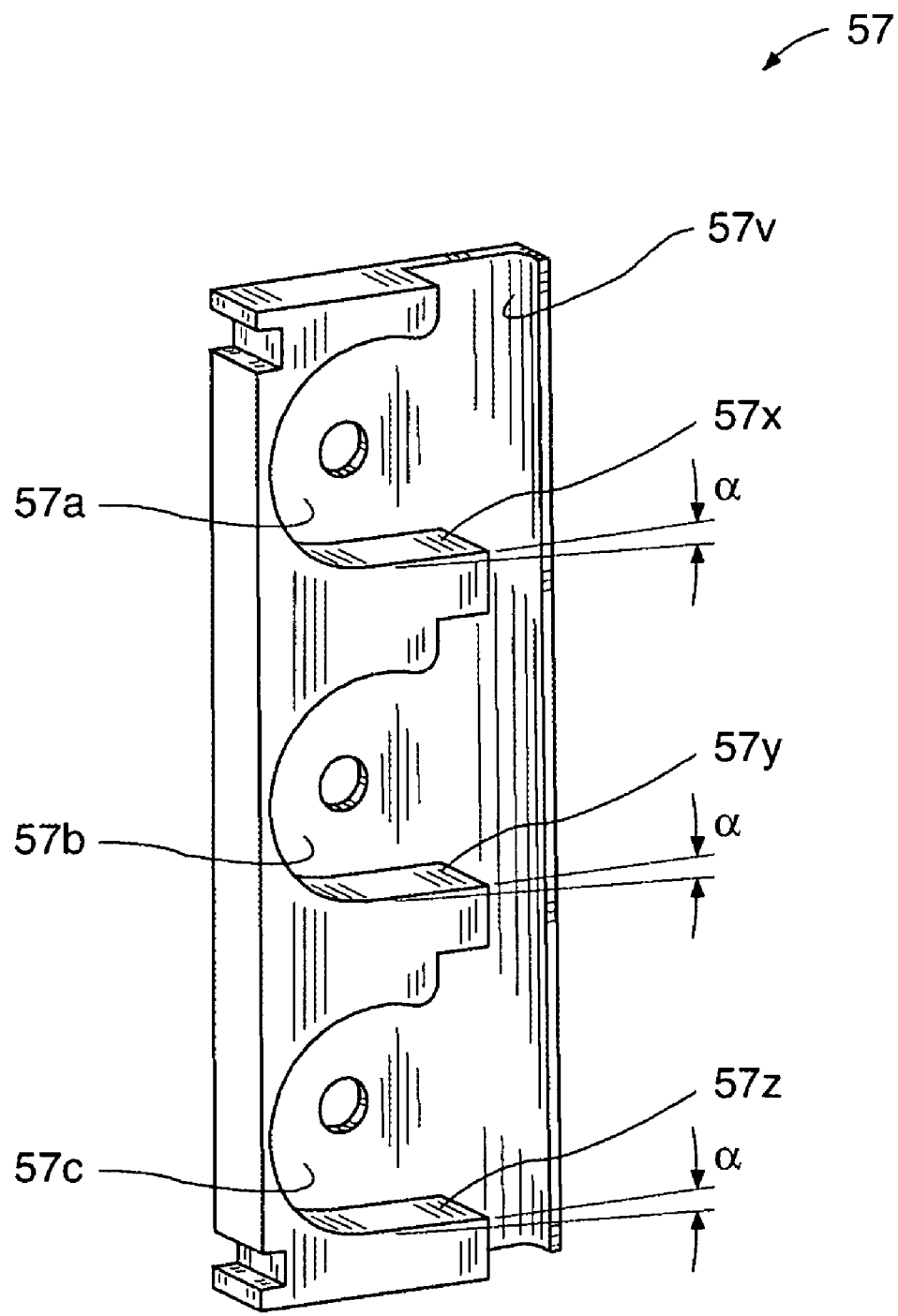
FIG. 22 is a perspective view of a cold air guide for directing air from the cold air blowers.

A configuration for the cold air guide 57 is shown in FIG. 22. In the embodiment shown, the guide 57 includes three blower recesses 57a, 57b, and 57c, and three cold air guide surfaces 57x, 57y, and 57z. As shown in FIG. 22, the cold air guide surfaces 57x, 57y, and 57z may slope upwardly from left to right at an angle "α" relative to horizontal. Preferably, the angle α is about 6 degrees. This angle provides a desired cold air flow pattern in the docking station 20. The guide 57 also includes a transition corner 57r that acts to turn the flow of cold air toward a cart 30 in the docking station 20 (see FIG. 2). The cold air guide is preferably constructed of a rigid insulating foam material.

The cart 30 includes an interior space comprising a hot food chamber 80 and a cold food chamber 90. As shown in FIG. 2, the hot food chamber 80 is located proximate to the hot air outlet port 28 of the docking station 20, and the cold food chamber 90 is located proximate to the cold air outlet port 29. The hot food chamber 80 and the cold food chamber 90 are separated by a thermal partition 44. The thermal partition 44 includes at least one insulating layer (such as an insulating foam layer) to thermally insulate the hot and cold food chambers 80, 90 from each other. The thermal partition 44 may include a thermal break or air layer to substantially prevent the conduction of heat between the hot and cold chambers 80, 90. Preferably, the thermal partition 44 is removably mounted in the housing 32.

Figure 6:
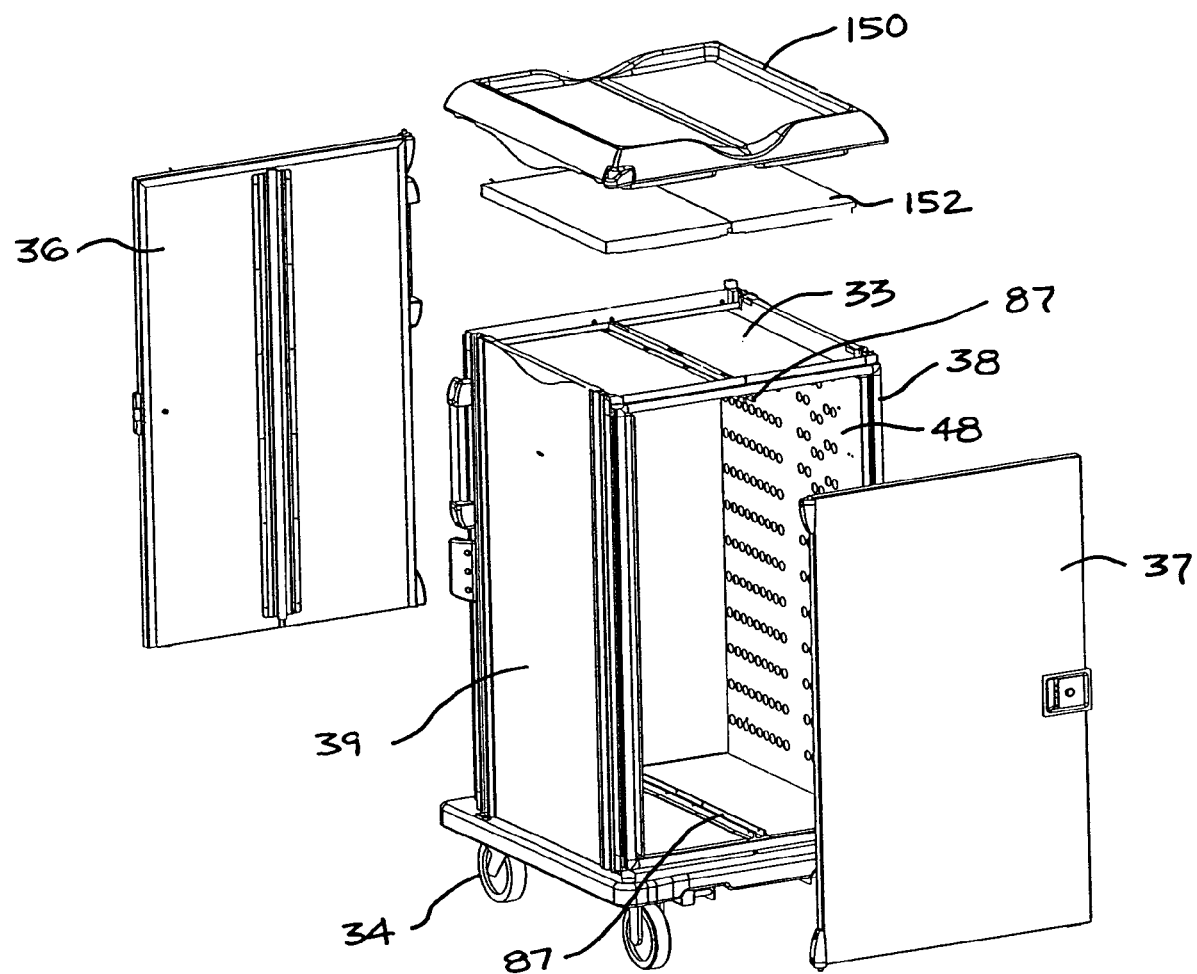
FIG. 6 is a partially exploded perspective view of the cart shown in FIG. 1.
Figure 7:
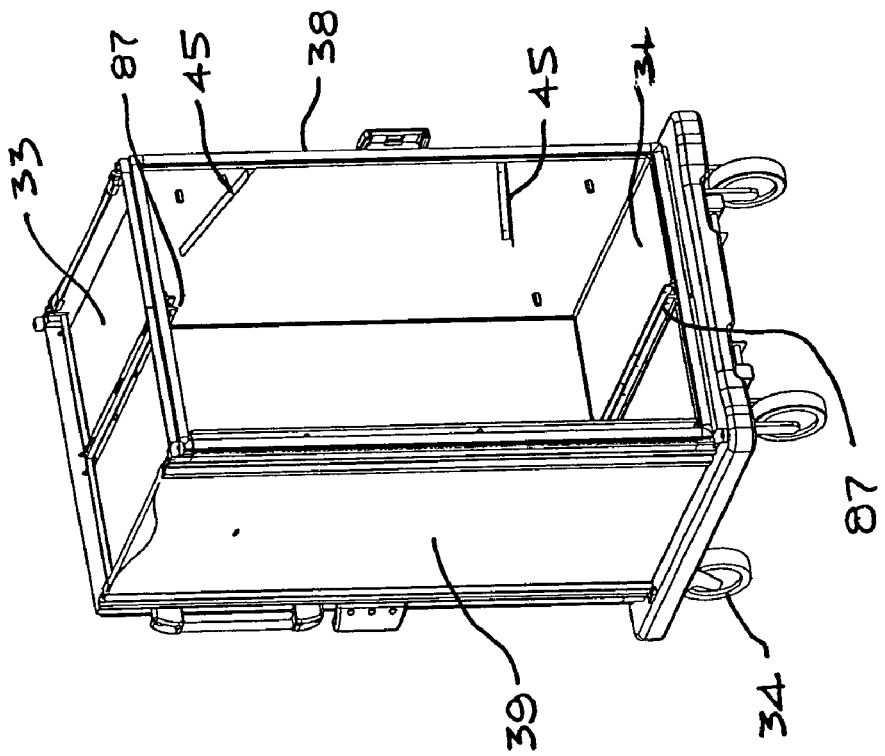
Figure 9:
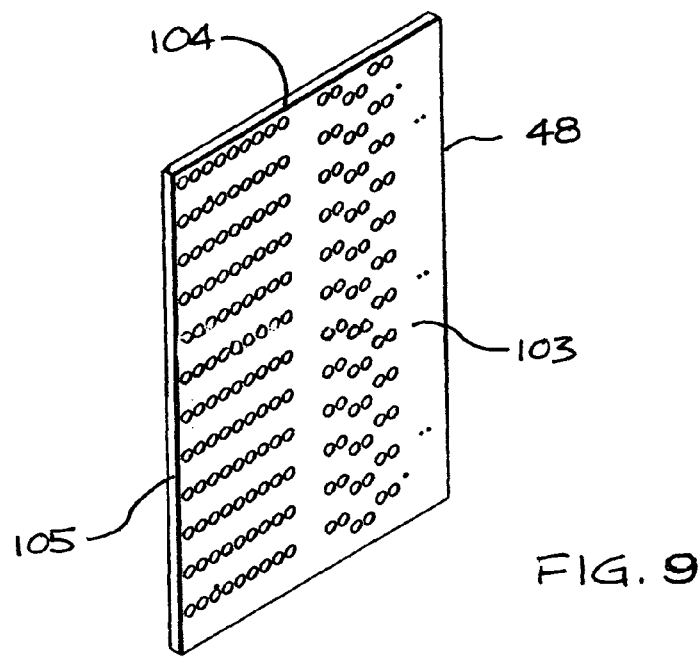
FIG. 9 is a perspective view of a left air distribution panel for the cart shown in FIGS. 1, 2, 7 and 8.
Figure 10:
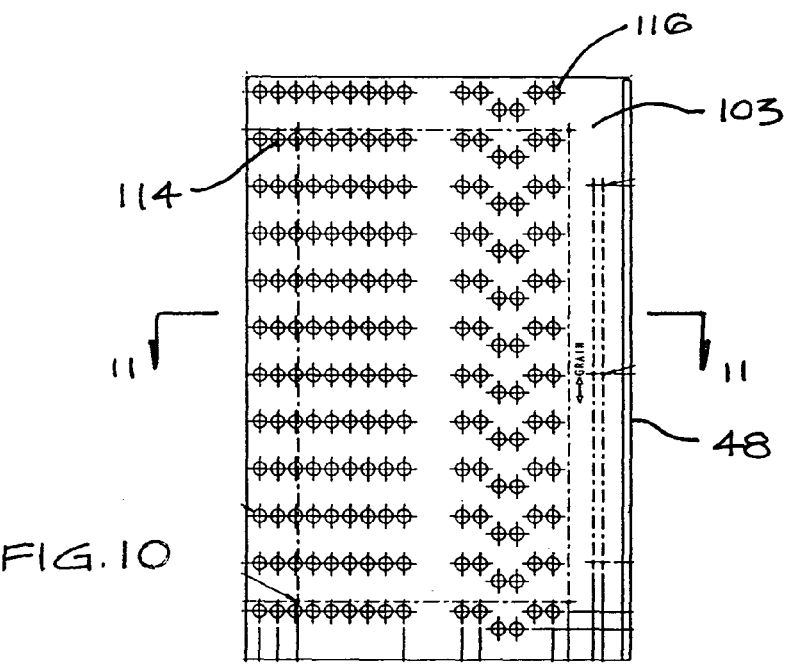
FIG. 10 is an elevation view of the air distribution panel shown in FIG. 9.
Figure 11:
FIG. 11 is a top cross-sectional view of the air distribution panel shown in FIGS. 9 and 10 taken along line 11—11 in FIG. 10.
Figure 20:
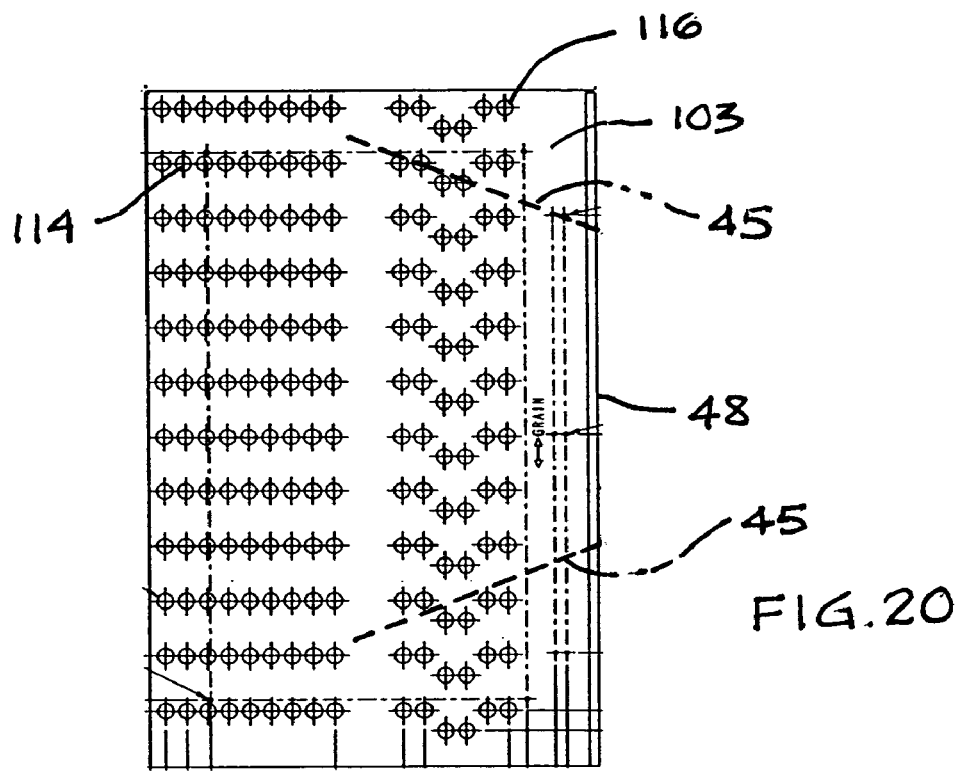
FIG. 20 is an elevation view of the hot air distribution panel shown in FIGS. 9–11 as viewed from inside the hot food chamber showing an arrangement for the hot air baffles inside the hot air plenum.

As shown in FIGS. 2 and 6, the housing 32 of cart 30 includes a first sidewall 38, a second sidewall 39, a bottom 31, a back door 36 (the door farthest from the docking station; shown in FIG. 2 in a closed position), and a front door 37 (the door closest to the docking station; shown in FIG. 2 in an open, docking position). Preferably, the sidewalls 38, 39, the doors 36, 37, the bottom 31, and the top 33 include at least one insulating layer 152 (such as a layer of insulating foam or other thermal insulating material). In a preferred embodiment, the sidewalls 38, 39, the bottom 31, the top 33, and the doors 36, 37 include a thermal break to prevent undesirable thermal conduction. A hot air plenum 40 is located in the cart 30 adjacent to and substantially coextensive with the first sidewall 38. The hot air plenum 40 is bounded by the first sidewall 38, and a hot air distribution panel 48. As shown in FIGS. 9–11, the hot air distribution panel 48 includes a face plate 103, a top plate 104, and an end plate 105. The face plate 103 includes a plurality of openings or vents 114, 116 distributed across its width and height. The openings 114, 116 are arranged such that heated air exiting the hot air plenum 40 is directed across the hot chamber above each level of food trays 62. The pattern of openings 114, 116 shown in FIG. 10 has been shown to provide a substantially uniform flow of air from each opening 114, 116 and across each tray level. The end plate 105 forms a closed end in the hot air plenum 40, thereby causing an increase in air pressure in the plenum 40 as hot air is forced into the plenum 40 from the docking station 20. As shown in FIG. 2, the open front end of the hot air plenum 40 forms a hot air inlet port 41 for receiving hot air from the hot air outlet port 28 of the docking station 20. In order to provide a uniform distribution of air within the hot air plenum 40 and to at least partially counter the tendency of hot air to rise to upper portions of the plenum 40, one or more hot air baffles 45 may be provided in the hot air plenum 40 as shown in FIGS. 7 and 20. The hot air baffles 45 are affixed to the first sidewall 38 of the housing 32, and are configured to cause at least a portion of hot air entering the hot air plenum 40 to be forced downward in the plenum 40 as the hot air passes from the front to the rear of the plenum 40, and to cause a desired even distribution of hot air within the plenum 40. The hot air baffles 45 contribute to the uniform distribution of air flow within the hot food chamber 80 and from the openings 114, 116. Other arrangements of hot air baffles 45 different from the arrangement shown in FIGS. 7 and 20 may be used to provide a uniform air flow distribution.

Figure 8:
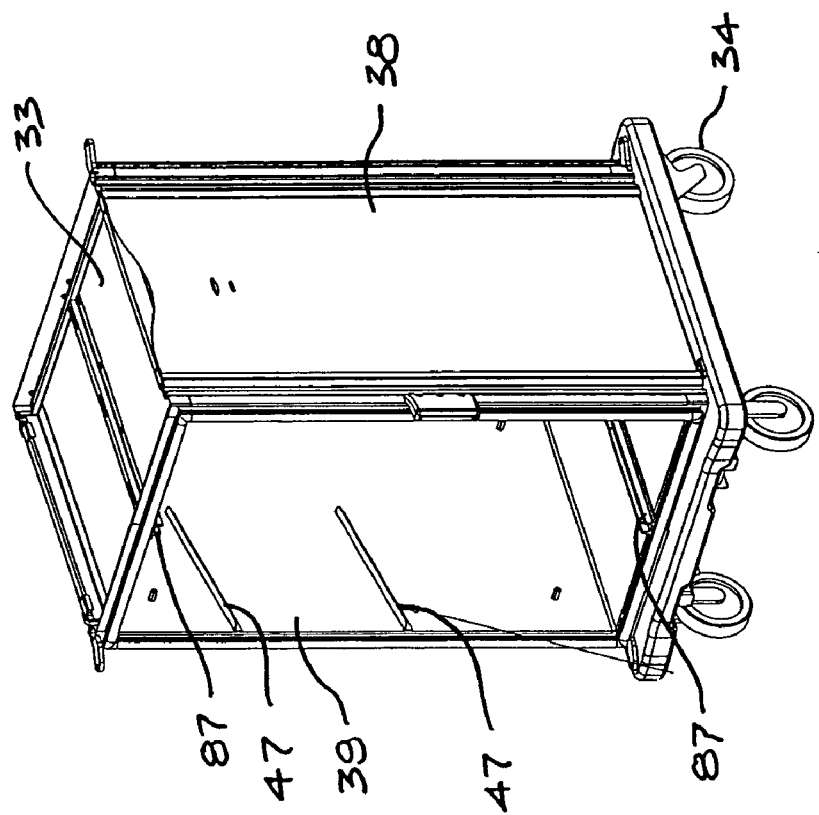
FIG. 8 is a front and right side perspective view of a portion of the housing of the food service cart shown in FIGS. 1, 2, and 7.
Figure 12:
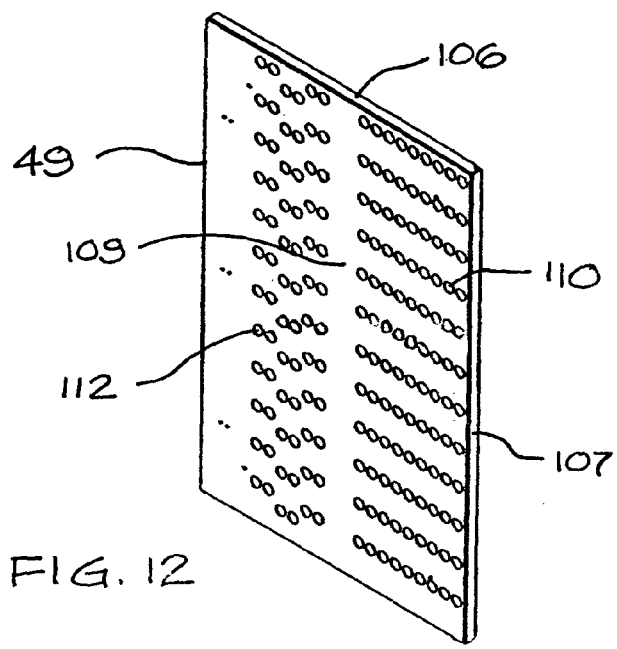
FIG. 12 is a perspective view of a left air distribution panel for the cart shown in FIGS. 1, 2, 7 and 8.
Figure 13:
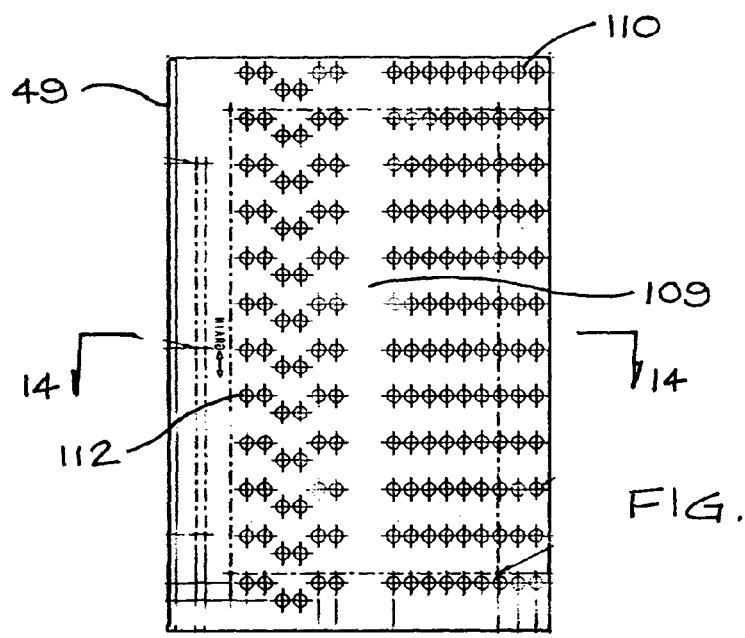
FIG. 13 is an elevation view of the air distribution panel shown in FIG. 12.
Figure 14:
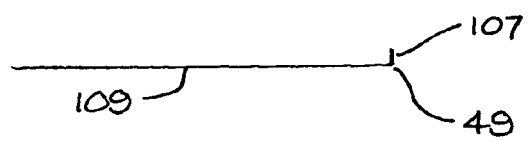
FIG. 14 is a top cross-sectional view of the air distribution panel shown in FIGS. 12 and 13 taken along line 14—14 in FIG. 13.
Figure 21:
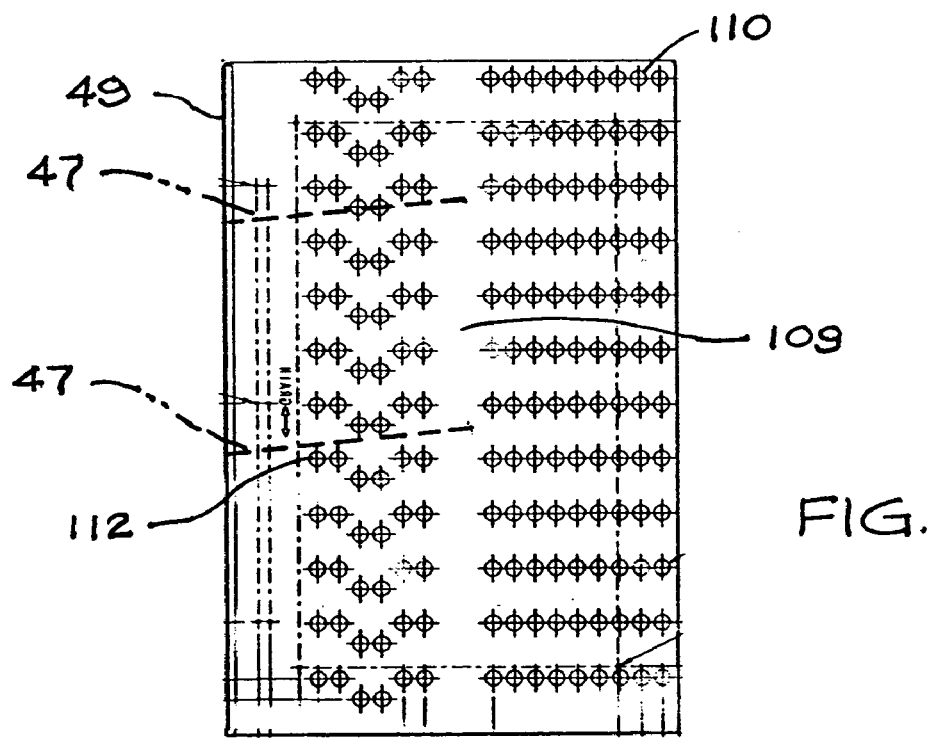
FIG. 21 is an elevation view of the cold air distribution panel shown in FIGS. 12–14 as viewed from inside the cold food chamber showing an arrangement for the cold air baffles inside the cold air plenum.

A cold air plenum 42 is located in the cart 30 adjacent to and substantially coextensive with the second sidewall 38. As shown in FIG. 2, the cold air plenum 42 is bounded by the second sidewall 39, and a cold air distribution panel 48. As shown in FIGS. 12–14, the cold air distribution panel 49 includes a face plate 109, a top plate 106, and an end plate 107. The face plate 109 includes a plurality of openings or vents 110, 112 distributed across its width and height. The openings 110, 112 are arranged such that chilled air exiting the cold air plenum 42 is directed across the cold chamber above each level of food trays 62. The openings 110, 112 are sized and positioned to provide a substantially even distribution of air flow from the plenum 42 to the cold food chamber 90. The pattern of openings 110, 112 shown in FIG. 13 has been shown to provide a substantially uniform flow of air through the openings 110, 112. The end plate 107 forms a closed end in the cold air plenum 42, thereby causing a substantial increase in air pressure inside the plenum 42 as cold air is forced into the plenum 42 from the docking station 20. As shown in FIG. 2, the open front end of the cold air plenum 42 forms a cold air inlet port 43 for receiving chilled air from the cold air outlet port 29 of the docking station 20. In order to provide a uniform distribution of air within the cold air plenum 42 and to at least partially counter the tendency of cold air to sink within the plenum, one or more cold air baffles 47 may be provided in the cold air plenum 42 as shown in FIGS. 8 and 21. The cold air baffles 47 are affixed to the second sidewall 39 of the housing, and are configured to cause at least a portion of cold air entering the cold air plenum 42 to be forced upward in the plenum 42 as the cold air passes from the front to the rear of the plenum, and to provide a desired distribution of cold air within the plenum 42. The cold air baffles 47 contribute to the uniform distribution of air flow within the cold food chamber 90 of the cart 30. Other arrangements of cold air baffles 47 different from the arrangement shown in FIGS. 8 and 21 may be used to provide a uniform air flow distribution.

Figure 15:
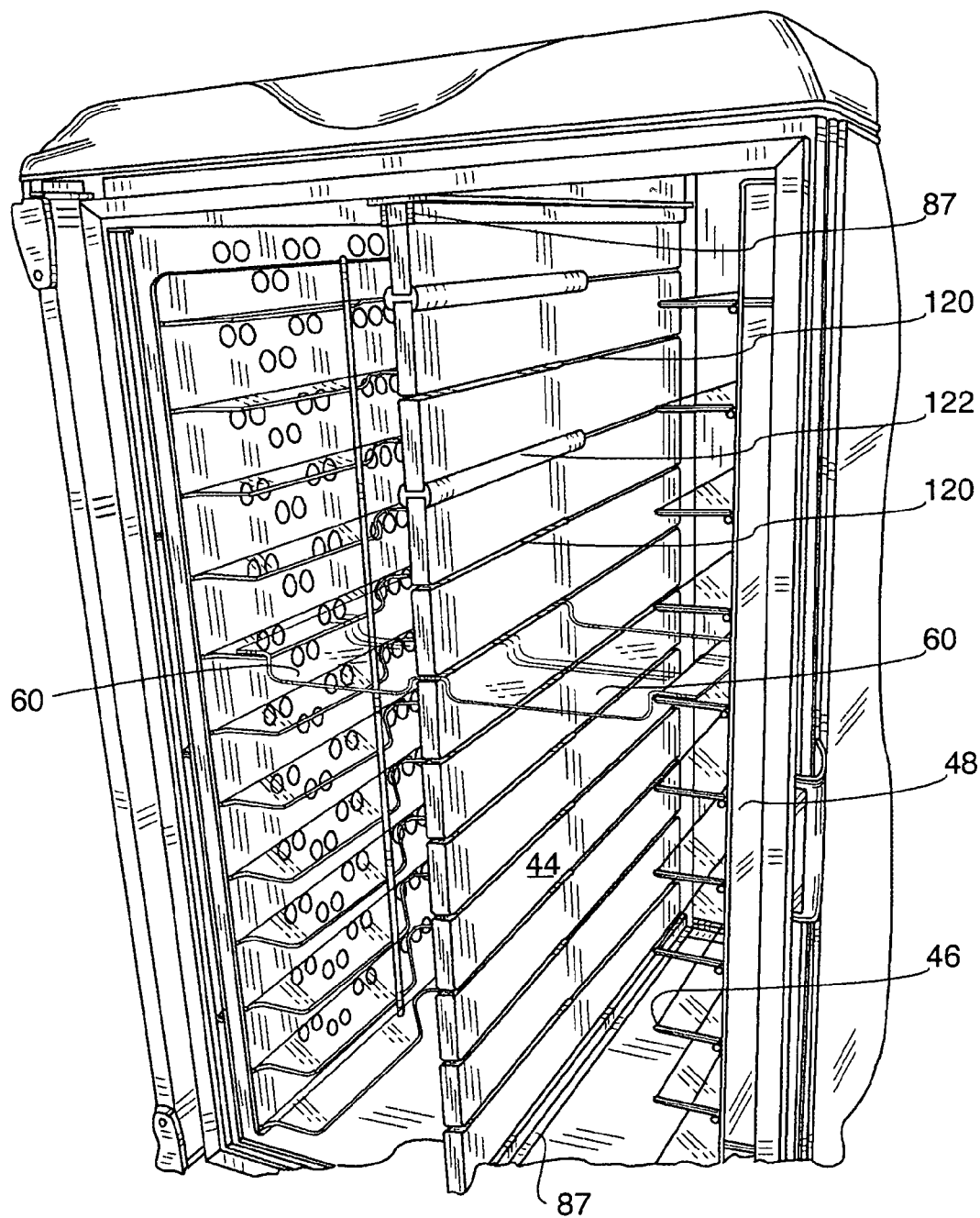
FIG. 15 is a perspective view of the open front of a food delivery cart according to the invention.

As shown in FIG. 2, a plurality of tray supports 46 are positioned on the inside faces of the hot air distribution panel 48 and cold air distribution panel 49. In order that the tray supports 46 do not significantly interfere with the convective air currents in the hot and cold chambers 80, 90, the tray supports 46 preferably are positioned between the openings 110, 112, 114, and 116 in the distribution panels 48, 49, and are constructed of formed metal rods as shown in FIG. 15. A typical tray 60 is shown supported between opposed tray supports 46 in a rear portion of the cart 30. As shown, one end portion of the tray 60 is positioned inside the hot food chamber 80, and the opposite end portion of the tray 60 is positioned in the cold food chamber 90. The tray supports 46 are positioned such that at least one vertical array of trays 60 can be placed in the cart 30. Preferably, the cart 30 has sufficient depth to permit at least two vertical arrays of food trays 60 to be placed inside the cart 30. In the embodiment shown in FIG. 2, a first vertical array of trays 60 can be placed in the cart 30 adjacent to the back door 36, and a second vertical array of trays 60 (not shown) can be placed in the cart adjacent to the front of the cart 30.

As shown in FIG. 15, the thermal partition 44 includes a plurality of spaced horizontal tray slots 120 that are sized to receive flat, central portions 64 of the trays 60. The slots 120 permit the hot food and cold food ends of the trays 60 to span respective sides of the thermal partition 44 when the central portions 64 of the trays 60 are engaged in the slots 120. The slots 120 are vertically spaced and positioned such that they correspond to a column of vertically spaced tray positions defined by the opposed tray supports 46. As shown in FIG. 15, the thermal partition 44 may include a first set of slots 120 along its front edge, and may include a second set of slots 120 along its back edge. The two sets of slots 120 permit a first set of trays 60 to be vertically arranged in a rear portion of the cart 30, and a second set of trays 60 to be vertically arranged in a front portion of the cart 30. When a tray location in the cart 30 is not used, it is desirable to close the corresponding open slot 120 in the partition 44 such that heated or chilled air does not pass through the open slot 120 between the hot and cold food chambers 80, 90. Slot fillers 122 may be provided to fill such open slots 120 as shown in FIG. 15. Preferably the slot fillers 122 are configured such that they provide a substantially air-tight seal when engaged in a slot 120. The cart 30 may include top and bottom partition channels 87 for supporting the thermal partition 44 in the cart 30. The channels 87 permit the partition 44 to be removed from the cart 30 by sliding the partition 44 through either the open front or open rear of the cart.

In operation, pre-plated foods are placed on trays 60 and the trays 60 are placed inside the cart 30 such that foods that are to be served cold reside in the cold chamber 90, and foods that are to be served hot reside in the hot chamber 80. The cart 30 may then be transported to a food service location. The cart 30 is docked with the docking station 20. In a preferred embodiment, the docking station automatically initiates a chilling cycle when the cart 30 is docked with the docking station 20. In the chilling mode, foods in both the hot and cold chambers 80, 90 are refrigerated at a safe storage temperature by introducing only cold air from the docking station 20 into the cart 30. At a time prior to the time the food in the cart 30 is served, a rethermalization cycle is initiated. In a preferred embodiment, refrigerated foods in the hot chamber are heated from about 40 degrees F. to about 262 degrees F. in about 45–55 minutes. While the hot chamber 80 is being heated, the system 10 maintains the cold chamber 90 at a safe cold temperature.

The flow paths of heated and chilled air currents in the mated docking station 20 and cart 30 during a rethermalization cycle are indicated by arrows in FIG. 2. The flow path of heated air is indicated by the arrows on the hot side "H" of FIG. 2. To initiate a heating cycle, the blower(s) 25 and heaters 24 are activated, and air is blown over the heating elements 24 by the blower(s). The resultant heated air is directed into the hot air outlet port 28 of the docking station 20. The heated air then passes into the hot air plenum of the cart 30 through the hot air inlet port 41. Preferably, the rate of injection of heated air into the hot air plenum 40 is sufficient to cause a substantial elevation of air pressure inside the plenum 40 above the ambient air pressure. As the heated air passes through the hot air plenum from front to back, portions of the heated air exit the hot air plenum 40 through the openings or vents 114, 116 in the hot air distribution panel 48. Preferably, the system is configured such that the heated air traverses the hot air food chamber 80 at a high velocity to maximize the convective heat transfer from the heated air to food within the chamber 80. Once the hot air passes over an array of food trays 60 in the cart 30, the air is drawn toward the front of the cart 30, through the open front of the cart 30, and into the hot side of the docking station 20 through the hot air return opening 50. In a preferred arrangement, at least a portion of the returned hot air passes over the condenser 70 of the docking station's refrigeration system to gain additional heat being dissipated by the condenser 70. The hot air is then returned to the intake(s) of the hot air blower(s) 25, and the hot air is recirculated through the system.

As shown in FIG. 2, chilled air circulates through the cold side "C" of the system 10 in a similar manner. To initiate a chilling cycle, the cold air blower(s) 26 and refrigeration unit are activated, and air is drawn through the evaporator 72 of the docking station 20, thus chilling the air. The chilled air then passes through the cold air blower(s) 26, is directed to the cold air outlet port 29, and into the cold air plenum 90 of the cart 30 through the cold air inlet port 43. Preferably, the rate of injection of chilled air into the cold air plenum 42 is sufficient to cause a substantial elevation of air pressure inside the plenum 42 above the ambient air pressure. As the chilled air passes through the cold air plenum 42 from front to back, portions of the chilled air exit the cold air plenum 42 through the openings or vents 110, 112 in the cold air distribution panel 49. Preferably, the system is configured such that the chilled air traverses the cold food chamber 90 at a high velocity to maximize the convective heat transfer from the food to the chilled air within the chamber 90. Once the chilled air passes over an array of food trays 60 in the cart 30, the air is drawn toward the front of the cart 30, through the open front of the cart 30, and into the refrigeration side of the docking station 20 through the cold air return opening 52. The cold air is chilled again as it passes across the evaporator 72, is returned to the intake(s) of the cold air blower(s) 26, and is recirculated through the system.

In a preferred embodiment, the cart 30 is configured to hold between about 20 and about 24 food trays 60 in two vertical arrays. The exterior portions of the sidewalls 38, 39 and doors 36, 37 of the cart 30 preferably are constructed of stainless steel for durability.

Figure 18:
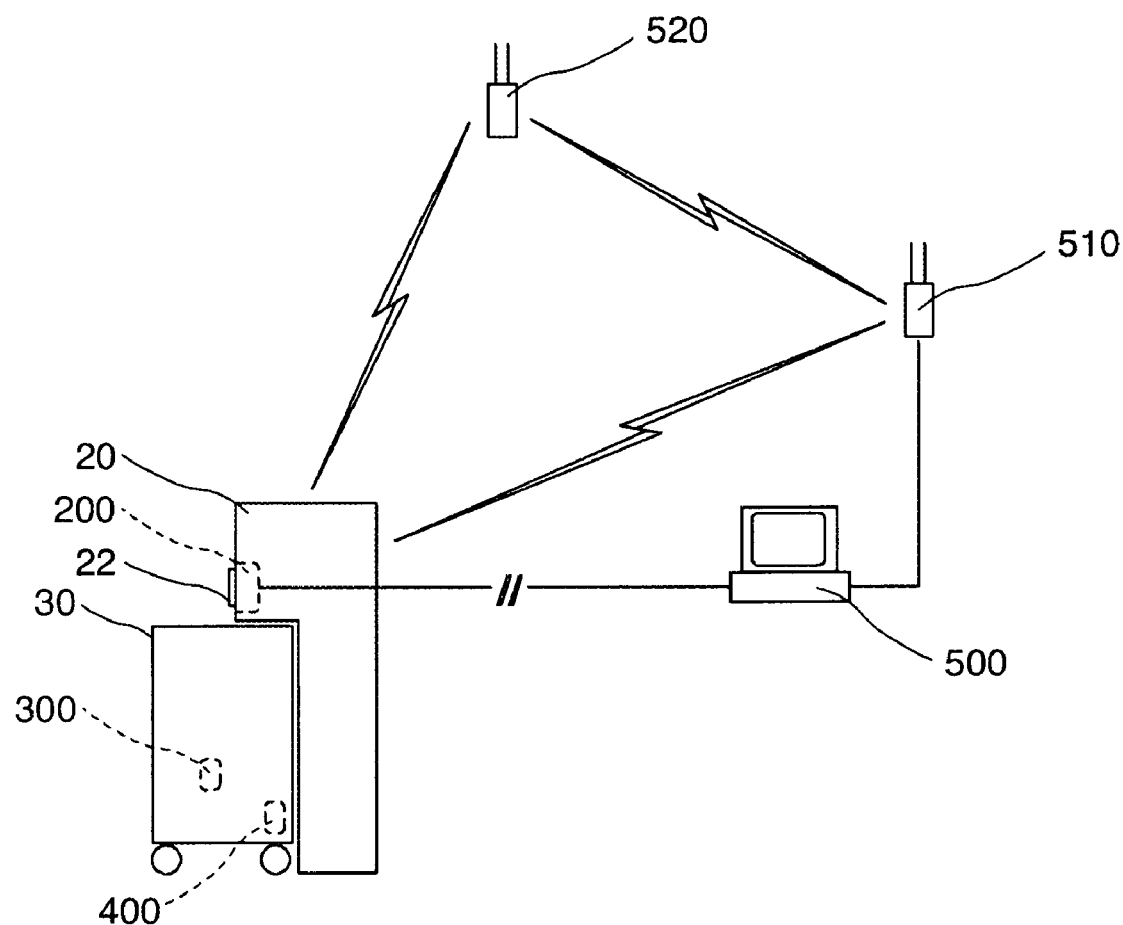
FIG. 18 is a schematic illustration of a control and monitoring system for the food delivery system.

Operation of the docking station 20 is controlled by a suitable programmable controller 200 with a control panel interface 22. As shown schematically in FIG. 18, the control system preferably includes at least one temperature sensor 300 in both the cold chamber 90 and the hot chamber 80 of the cart 30, and at least one cart proximity switch 400 in the docking station 20. The temperature sensors 300 and cart proximity switch 400 transmit data to the controller 200 for control of the refrigeration and rethermalization systems. The data may be communicated directly to the controller 200, or may be communicated to the controller 200 via a central computer 500.

In order to ensure the safety of hot and cold foods within the cart 30, the system 10 may also include a wireless HACCP monitoring system. As shown schematically in FIG. 18, one embodiment of a HACCP monitoring system includes a computer 500 and a base station receiver 510. The base station receiver is configured to receive radio-frequency signals (e.g. 900 MHz) from wireless temperature transmitters 300, the cart proximity switch 400, and/or the controller 200, and to forward the received data to a central computer 500. The computer 500 is programmed to process the received data and to forward appropriate control signals to the base station controller 200. The computer 500 may also be programmed to provide alert messages to one or more responsible persons when received data falls outside predetermined control limits. For example, the computer 500 may be programmed to generate a "pop-up" window alert on the display of the computer 500 when a received temperature reading is outside of acceptable limits. The computer 500 may also be programmed to transmit e-mail messages, numeric pages, audible alarms, or the like to alert responsible persons located at remote locations. The computer 500 may also be programmed to store received monitoring data, and to generate detailed monitoring reports as desired. One or more wireless repeaters 520 may be used to forward data from the refrigeration/rethermalization system 10 to the base station 510 when the cart 30 and docking station 20 are in a location that prevents direct communication with the base station 510.

The above descriptions of embodiments of the invention are for the purpose of illustration only, and are not intended to limit the scope of the invention. Persons of ordinary skill in the art will recognize that various modifications may be made to the described embodiments without departing from the invention. All such modifications are intended to be within the scope of the invention as recited in the appended claims.

What is claimed is:

1. A food refrigeration and rethermalization system comprising:
   (a) a cart comprising:
      (i) a housing including opposed first and second sidewalls, a thermal partition that divides an interior space in the housing into a cold chamber and a hot chamber, and a substantially open front configured to receive food items therethrough;
      (ii) a vertically oriented cold air plenum formed between the first sidewall of the housing, a cold air distribution panel, a substantially open front end and a closed back end; the cold air distribution panel having a plurality of cold air vents forming a plurality of cold air flow paths between the cold air plenum and the cold chamber;
      (iii) a vertically oriented hot air plenum formed between the second sidewall of the housing, a hot air distribution panel, a substantially open front end, and a closed back end; the hot air distribution panel having a plurality of hot air vents forming a plurality of hot air flow paths between the hot air plenum and the hot chamber; and
   (b) a docking station comprising:
      (i) a cold air supply system for supplying forced chilled air into the substantially open front end of the cold air plenum;
      (ii) a hot air supply system for supplying forced heated air into the substantially open front end of the hot air plenum; and
      (iii) one or more seals configured to provide substantially air-tight mating engagement between the docking station and the front of the cart when the cart is docked to the docking station.

2. A food refrigeration and rethermalization system according to claim 1 wherein the cold air vents are configured so as to cause cold air to flow substantially evenly throughout the cold chamber, and the hot air vents are configured so as to cause hot air to flow substantially evenly throughout the hot chamber.

3. A food refrigeration and rethermalization system according to claim 1 wherein the cart further comprises a front door for selectively closing the substantially open front of the housing.

4. A food refrigeration and rethermalization system according to claim 1 wherein the housing further comprises a substantially open back, and wherein the cart further comprises a back door for selectively closing the substantially open back of the housing.

5. A food refrigeration and rethermalization system according to claim 1 wherein the cart further comprises at least one cold air baffle in the cold air plenum.

6. A food refrigeration and rethermalization system according to claim 1 wherein the cart further comprises at least one hot air baffle in the hot air plenum.

7. A food refrigeration and rethermalization system according to claim 1 wherein the cart further comprises a plurality of tray supports in the housing, the tray supports being configured to support a plurality of trays in at least one spaced vertical array in the housing.

8. A food refrigeration and rethermalization system according to claim 1 wherein the hot air supply system includes at least one heater, at least one blower, and at least one hot air guide for directing air from the heater and blower into the substantially open front end of the hot air plenum.

9. A food refrigeration and rethermalization system according to claim 1 wherein the cold air supply system includes a refrigeration system, at least one blower, and at least one cold air guide for directing air from the refrigeration system and blower into the substantially open front end of the cold air plenum.

10. A food refrigeration and rethermalization system according to claim 1 wherein the housing further comprises a top and a bottom, and wherein the first and second sidewalls, the top, and the bottom comprise thermal insulation.

\* \* \* \* \*

UNITED STATES PATENT AND TRADEMARK OFFICE
CERTIFICATE OF CORRECTION

| | |
|---|---|
| PATENT NO. | : 7,025,121 B2 |
| APPLICATION NO. | : 10/635120 |
| DATED | : April 11, 2006 |
| INVENTOR(S) | : Lara Lee Whitehead et al. |

It is certified that error appears in the above-identified patent and that said Letters Patent is hereby corrected as shown below:

In the Claims

Claim 1(a)(iii), Column 10, line 27, the second "," should be removed so that the line reading: "distribution panel, a substantially open front end, and" should read --distribution panel, a substantially open front end and--.

Signed and Sealed this
Sixteenth Day of September, 2014

Michelle K. Lee
*Deputy Director of the United States Patent and Trademark Office*